United States Patent [19]

Chisholm

[11] Patent Number: 5,386,884

[45] Date of Patent: Feb. 7, 1995

[54] SPRING ASSEMBLIES

[75] Inventor: David Chisholm, Louisville, Ky.

[73] Assignee: Tensator Ltd., Bucks, England

[21] Appl. No.: 109,499

[22] Filed: Aug. 20, 1993

[30] Foreign Application Priority Data

Aug. 21, 1992 [GB] United Kingdom ............... 9217888

[51] Int. Cl.⁶ .................... E05F 1/10; F03G 1/02
[52] U.S. Cl. ........................ 185/39; 185/43;
185/45; 16/277; 16/296; 49/386; 267/156
[58] Field of Search ........ 185/37, 39, 43, 45;
16/277, 295, 296; 49/386; 267/156

[56] References Cited

U.S. PATENT DOCUMENTS

| | | | |
|---|---|---|---|
| 834,635 | 10/1906 | Olson | 16/277 X |
| 2,550,348 | 4/1951 | Hansen | 16/277 X |
| 2,584,404 | 2/1952 | Webb | 16/277 X |
| 3,047,280 | 7/1962 | Pernetta | 267/156 |
| 4,719,992 | 1/1988 | Elward et al. | 185/43 |

FOREIGN PATENT DOCUMENTS 970769  9/1964 United Kingdom .
2212212  7/1989 United Kingdom ............... 49/386

Primary Examiner—Allan D. Herrmann
Attorney, Agent, or Firm—Cushman, Darby & Cushman

[57] ABSTRACT

A spring assembly of the kind having a coiled strip spring member (34) supported at one end on an arcuate drum portion (16) about which it is reverse wound and coiled at its other end about an abutment (20) further includes a base plate (10) mounting the drum portion (16) and a second base plate (18) mounting the abutment (20), the base plates (10) and (18) being interconnected by pins (32) attached to base plate (18) running in slots (26, 28) provided on base plate (10) so as to prevent relative movement of the base plates which would allow the spring to coil further about the abutment (20). The base plate (10) is provided with a cover (40) with which it forms a housing portion and the base plate (18) is provided with a cover (38) with which it forms a second housing portion. The assembly can be dropped on to support pins (14, 22) attached to respective halves (42, 44) of a hinge, e.g. of an automobile trunk or lid.

12 Claims, 2 Drawing Sheets

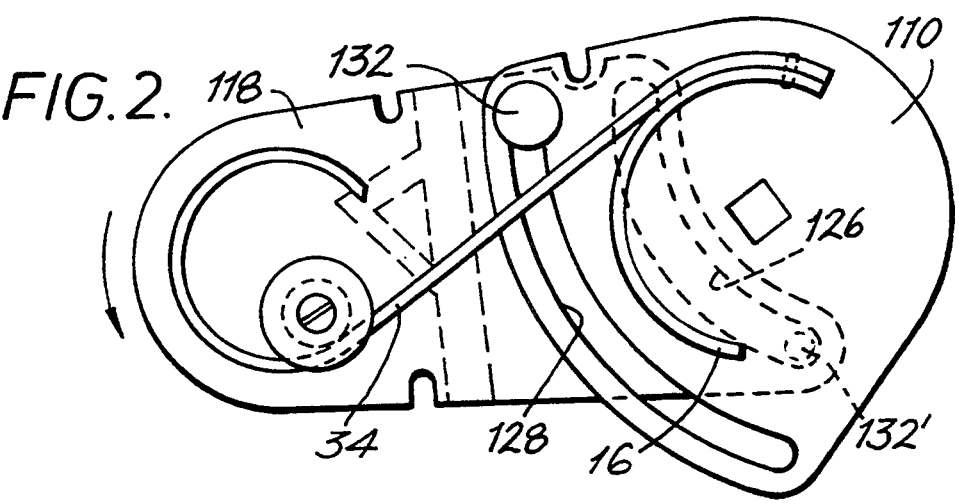
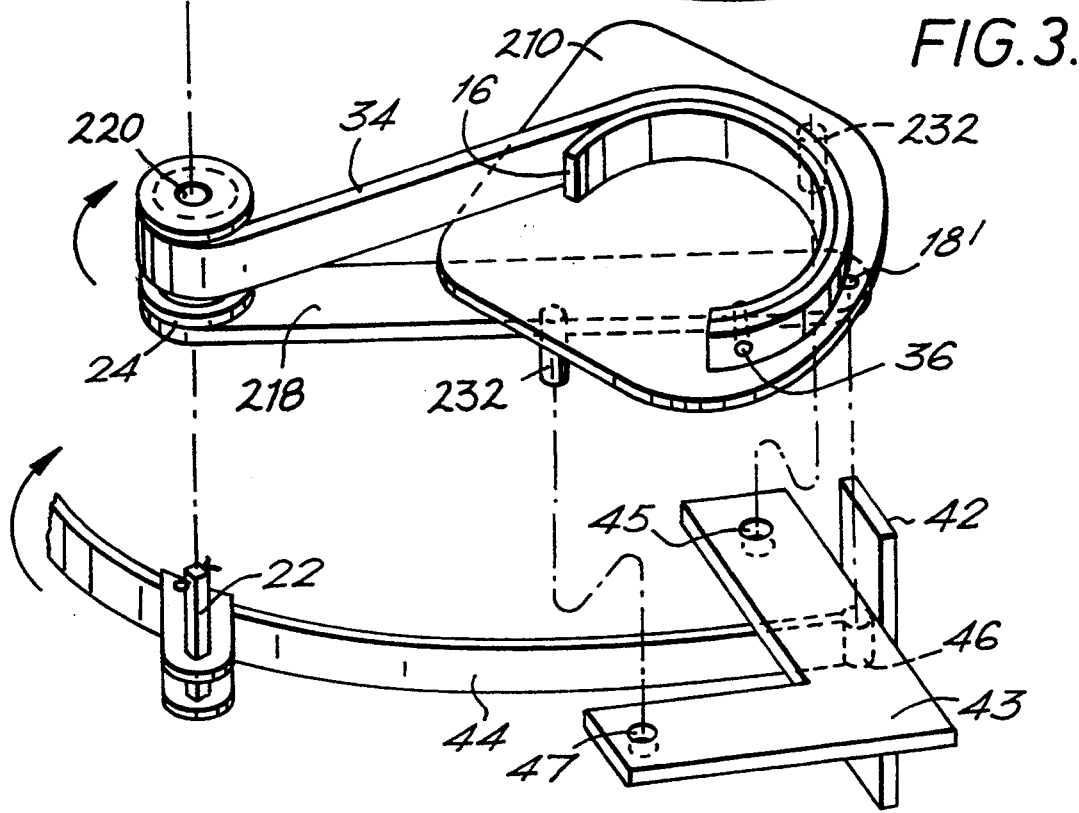

SPRING ASSEMBLIES

FIELD OF INVENTION

The present invention relates to spring assemblies in which a coiled strip spring member, optionally consisting of a plurality of spring leaves is supported, typically at one end, for reverse winding (i.e. winding against its coiling direction) on means defining an arcuate path of support and at its other end forms a coil and is positioned against an abutment member which forces unwinding of said coil as the spring is reverse wound over the means defining the arcuate path of support in use.

BACKGROUND TO THE INVENTION

Spring assemblies of this general type are disclosed in U.S. Pat. No. 3,047,280. Also described is their use in connection with hinge mechanisms such as for instance the hinges supporting the tail gate, boot lid (or trunk lid) or bonnet (or hood) of an automobile.

Automobile boot lids and tail gates are conventionally mounted on hinges which are biassed to the open position by gas struts. As compared to springs, gas struts have a number of known disadvantages. A major problem is that the force which they exert varies substantially according to the ambient temperature.

Springs do not suffer from this disadvantage but previous proposals for the use of springs in supporting components of this nature have also encountered practical difficulties. Helical coil springs and torsion bars have been proposed but these often encroach into the usable space of the luggage storage area to a significant extent. The type of coil strip spring assembly described in U.S. Pat. No. 3,047,280 once installed avoids all these past disadvantages in that it is compact and insensitive to variations of ambient temperature.

However, despite the fact the use of these types of spring assemblies in this particular context was proposed as long ago as 1962 in U.S. Pat. No. 3,047,280 they have not been used to any significant extent in automobile manufacture.

The process of installation of a spring of this type into an automobile boot by way of example to construct such an installation would involve the attachment to one component of the hinge in situ in the boot of an arcuate support member such as part of a drum to which is secured one end of a multileaf coiled strip spring. An abutment member will be provided on another component of the hinge moveable with respect to the location for the arcuate support member and it will be necessary for the spring coil to be extended and positioned over the abutment member. For a spring capable of supporting an automobile boot lid or tail gate this will involve the application of very substantial amounts of force to the spring whilst it is in position in a physically confined and obstructed location. It is difficult to introduce into the space concerned the machinery necessary to achieve this and there is also the risk that a spring may escape as it is being extended and cause damage to the vehicle or risk of injury to the assembly workers as it lashes back.

Furthermore, it is not appropriate for springs of this nature to be painted because the paint will inevitably flake as the spring is repeatedly flexed in use. Accordingly, such an installation has to be carried out after the vehicle itself has been painted and there is thereby an extra danger of damage to the paint work of the vehicle during the spring installation. These practical difficulties have effectively caused the use of this type of spring to be abandoned or ignored and have caused the industry to put up with difficulties of the alternatives discussed above.

BRIEF DESCRIPTION OF THE INVENTION

We have now developed a design for a spring assembly of the kind with which the invention is generally concerned which avoids these difficulties.

The present invention provides in a first aspect a spring assembly comprising a coiled strip spring member, a first support member having mounted thereon means defining an arcuate path of support for the spring member such that the spring member may be wound against its natural coiling direction by rotation of said means through a part circle and a second support member carrying an abutment member against which said spring runs so as to force unwinding of said spring coil which said spring is reverse wound over the arcuate path of support, and means interconnecting said first and second support members such as to prevent relative movement thereof which would allow said spring to coil further.

The first and second support members may for instance each comprise a base plate and said means interconnecting said support members may interconnect said base plates.

Preferably, one of said support member base plates has at least one guidance slot therein and the other of said support member base plates carries a projection running in said guidance slot, said relative movement of the support members to allow further coiling of said spring about said abutment member being prevented by said projection reaching a limiting position in said guidance slot.

Preferably there are at least two said guidance slots each co-operating with a respective said projection.

Alternative means for interconnecting the support members so as to prevent relative movement thereof which would allow said spring to coil further can be used. For instance, a first and a second base plate may each be provided with respective abutment members which bear against one another to prevent movement of the base plates with respect to one another in a sense which would allow coiling of the spring.

As a further variant of this such base plates may be connected by frangible links such as frangible rivets or pins which hold the base plates together in a desired position until such time as the rivets are broken by a user putting the assembly into use. Equally, they may be connected by pins which are driven out by a user once the assembly is installed in position as described hereafter.

Preferably, each said base plate is provided with a respective cover member for defining with its respective base plate a housing or enclosure for a respective part of said spring member.

The means defining an arcuate path of support for the spring member may have a cylindrical or part cylindrical support surface and may for instance be a curved plate member. Preferably, an end portion of the spring member is attached to the means defining the arcuate path of support, normally towards one end thereof. Whilst the means defining the arcuate path of support preferably defines a continuous arcuate path of support, it is within the scope of the invention to use a discontinuous support means such a plurality of support posts arranged around an arcuate path.

Optionally, more than one abutment member is provided and optionally more than one coiled spring member is provided. For instance, a plurality of coiled spring members, e.g. two, may each be connected at one end to a common location on means defining an arcuate path of support such as an arcuate plate and may then each be lodged against a respective abutment member which forces unwinding of its respective spring coil as the arcuate path of support is rotated with respect to the abutment member.

Preferably, the coil formed by the strip spring member is arranged around the abutment member but alternatively it can be arranged to lie beyond the abutment member.

In an alternative aspect, the invention provides a spring assembly comprising a coiled strip spring member, means defining an arcuate path support for said spring member upon which said spring member may be wound against its natural coiling direction by rotation of said path defining means through a part circle, and an abutment member radially spaced from said path defining means against which said spring member is supported so as to force unwinding of said spring coil as the spring member is reverse wound onto said path defining means, said spring member, said path defining means and said abutment member being contained within housing means which permits limited planetary motion of said abutment member with respect to said path defining means to tension said spring member by reverse winding said spring member over said path defining means.

BRIEF DESCRIPTION OF THE DRAWINGS

The invention will be further illustrated by the following description of preferred embodiments thereof with reference to the accompanying drawings in which:

FIG. 2 shows a second embodiment in plan view; and FIG. 3 shows a third embodiment in exploded perspective view.

DETAILED DESCRIPTION OF PREFERRED EMBODIMENTS

Figure 1:
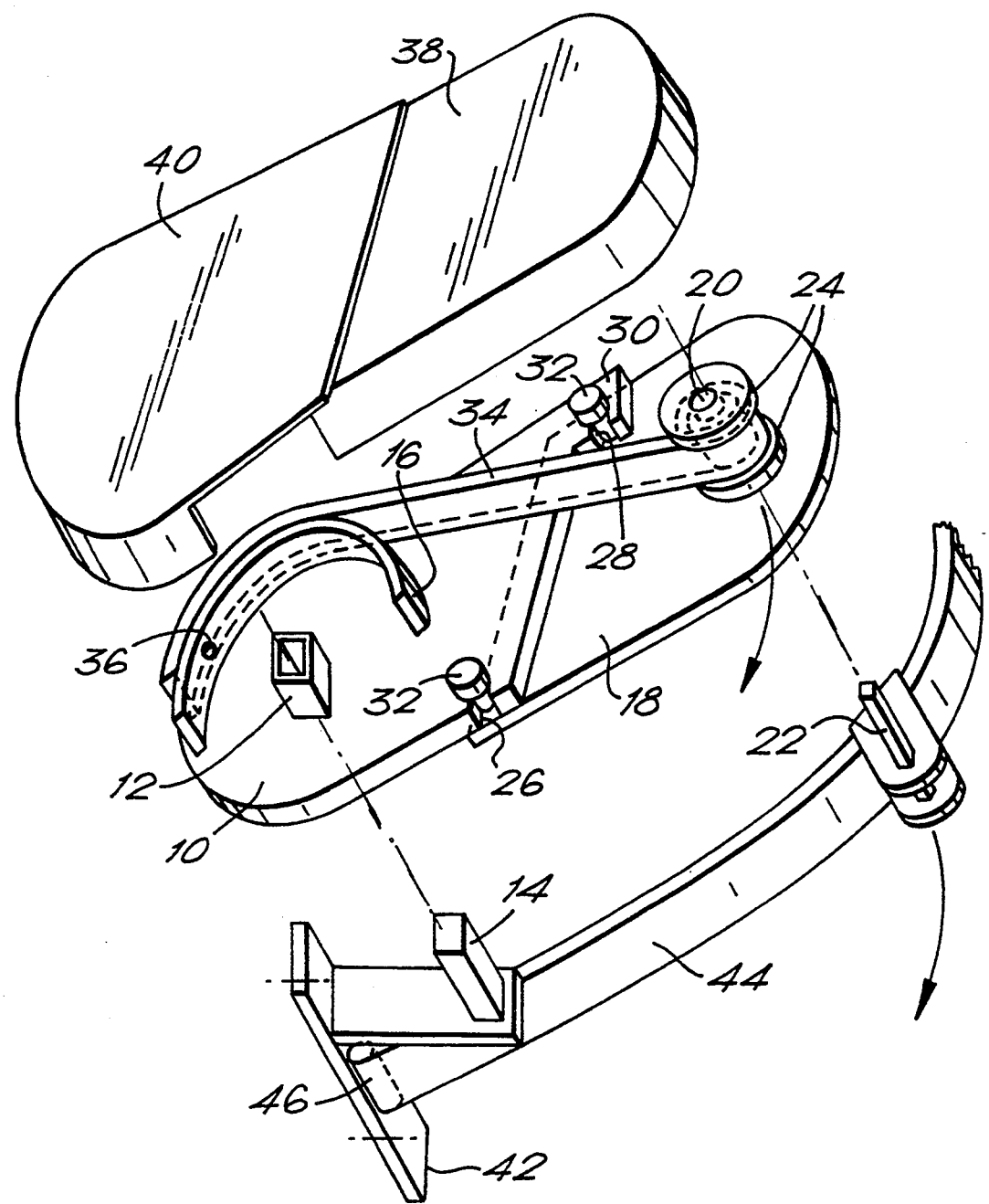
FIG. 1 shows an exploded view of a spring assembly according to the invention about to be mounted on a hinge for a vehicle boot lid.

The spring assembly illustrated in FIG. 1 comprises a first support member in the form of a base plate 10 which has a rectangular aperture therein over which is fixed a rectangular collar 12 forming a non-rotatable mounting for receiving a rectangular post 14 associated with the hinge assembly to which it is to be fitted. Mounted on the upper surface of the base plate 10 is an arcuate metal plate 16 in the form of a half circle firmly connected by its edge, e.g. by welding, to the base plate 10. A second base plate 18 has an abutment member in the form of hollow post 20 mounted over a non-circular aperture therein (e.g. a square aperture) for receiving in a non-rotatable manner a post 22 of corresponding section carried by a second component of the hinge assembly to be described hereafter. The hollow post 20 is provided with upper and lower flanges 24 spaced apart along the length of the post 20. Alternatively, a flanged bobbin may be fitted over the exterior of a plain hollow post 20, to rotate thereon. The base plate 10 overlies the base plate 18 and the two are connected together as follows. The base plate 10 has a pair of slots 26, 28. Slot 26 extend from one edge of the base plate 10 and has an opposite blind end. Slot 28 is positioned in a projecting lug 30 on the base plate 10 which has a surface facing in the same direction as that edge of the base plate 10 on to which the slot 26 opens. Slot 28 opens from that edge of the lug 30 and extends to a blind opposite end. A pair of connecting projections 32 extends from the base plate 18 upwards through the slots 26, 28 and are provided with head formations at their free ends overlying the base plate 10. A multi-laminate metal coiled strip spring member 34 is attached at one end to the arcuate plate 16 and extends over a portion of the arcuate plate 16 and thence to the abutment member 20 about which it freely coils. The spring member is attached to the arcuate plate 16 by a rivet 36 or any equivalent fixing such as a high tensile bolt or a nut and bolt assembly and over its entire length is predisposed to form a coil by bending in a sense opposite to that in which it is bent to follow the line of curvature of the arcuate plate 16. In the position illustrated therefore the spring member 34 is under tension and this tension serves to force the projections 32 towards to the blind ends of the slots 26, 28 in which they locate but further movement of the base plates to relieve the tension in the spring 34 by allowing it to unwind from the arcuate plate 16 is prevented by the slots 26, 28 and the projections 32 located against the blind ends thereof.

A pair of cover members 38, 40 are provided which clip over the respective base plates 18 and 10 and which each comprise a top wall and a depending substantially D-shaped skirt wall. With the base plates 10 and 18, the cover members 38 and 40 define a housing enclosing the spring member 34, the abutment 20 and the arcuate plate 16.

A hinge assembly to which the spring assembly described above is to be fitted is provided in the boot of an automobile and consists of a first member 42 fixed to the body of the automobile having a projecting arm upon which is positioned the mounting post 14 and a second member in the form of an arm 44 which is hinged a hinge location 46 to the first component 42 and which at its opposite end will be joined to the boot lid to be supported. The arm 44 carries on a bracket the mounting post 22 engageable in the bore within the hollow post 20 constituting the abutment member of the spring assembly.

To install the spring assembly on the hinge assembly all that is necessary is to first install the components of the hinge in the automobile boot, optionally with the boot lid in place, position the hinge components in the boot lid-raised position and fit the hollow posts 12 and 20 over the mounting posts 14 and 22. Closing the boot lid will then cause rotation of the abutment member 20 on its base plate 18 in a planetary manner about the arcuate plate 16 with the projections 32 leaving the slots 26 and 28 in which they are received. The spring will be further tensioned by further reverse winding over the arcuate support plate 16 providing counter balancing for the boot lid. When the boot lid is raised again, the projections 32 will reenter the slots 26 and 28 and the blind ends of those slots will eventually act as stops determining the extent of opening of the boot lid.

It will be appreciated that if the housing 38, 40 is paintable then this spring assembly may be installed prior to the spraying of the automobile. The housing assembly will protect the spring member 34 from being painted. The housing containing the spring member will thus be painted to match the car body, which is not possible using gas struts. It should further be appreciated that the mounting of the spring assembly on to the hinge assembly is an operation which can be conducted rapidly without the use of machinery and without any risk of the spring member 34 flying loose and causing damage. In use, the spring member is shielded from objects and from the users fingers when the boot is open, so conferring extra safety.

A further safety advantage compared to the form of installation shown in U.S. Pat. No. 3,047,280 is that if a vehicle owner or a mechanic tries to disassemble a hinge as shown therein he will be at risk of injury and at risk of causing damage as the spring will fly back with great vigour when released from the abutment which holds it. With the assembly described above this risk is removed and the two base plates can safely be removed from the hinge in the open position.

All of the disadvantages which have so far prevented the adoption of this otherwise advantageous manner of counter balancing vehicle components are therefore overcome.

The second embodiment shown in FIG. 2 is similar to that shown in FIG. 1 except that the base plate 110 is formed with an arcuate slot 128 and the base plate 118 is formed with an arcuate slot 126. A pin 132 on the base plate 118 runs in the arcuate slot 128 of the base plate 110 and a similar pin 132' depending from the underside of the base plate 110 runs in the arcuate slot 126 in base plate 118. The pins 132, 132' are captive in their slots and do not escape therefrom. Each has an enlarged head preventing separation of the plates along the axes of the pins 132, 132'. The spring assembly is shown in a position which would correspond to the open position of a vehicle boot lid supported by the spring. On closing the boot lid, the base plate 118 would be moved in the direction shown by the arrow so as to tension further the spring member 34 by reverse winding it about the arcuate plate 16.

In the third embodiment shown in FIG. 3, the base plate 210 has a pivoting arm 218 mounted thereto at a pivot 218 and the abutment 220 is positioned on the end of the arm 218. The hinge mounting includes a pivoting arm 44 hinged to a first component 42 of the hinge which bears an L-shaped plate 43 having a first and a second through holes 45, 47 therein. Clinch studs 232 depending from the underside of base plate 210 are received in the holes 45, 47 to mount the base plate 210 to the first component 42 of the hinge assembly.

A single cover 238 is mounted to the abutment 220 and extends to cover the arcuate plate 16 on the base plate 10.

The spring assembly is shown in the fully tensioned position, corresponding to the closed position of a car boot lid. As the spring assembly moves to the fully open position by pivoting in the direction indicated by the arrow, the leading edge of the swinging arm 218 comes to abut against the clinch stud 232 which limits its further movement in the unwinding direction. At this point, the spring assembly is removable and installable on the hinge assembly with the tension of the spring being supported on the clinch stud 232.

Many modifications and variations of the invention as described above are possible. For instance, in FIG. 1 the entry of the projections 32 into their slots 26, 28 may be arranged to provide a progressive cushioning and buffering action which will cushion the arrival of the boot lid into its fully open position. This might for instance be arranged by providing springs within the slots 26, 28 against which the projections 32 will bear as they run down the slots. Also such projections may operate a latch to hold the boot lid fully open.

A spring assembly of the type claimed can greatly facilitate the wiring of components mounted on the boot lid such as lamps and sensor switches. To this end, a spring assembly according to the invention may be provided with a first electrical connector or set of electrical connectors associated with the first support member and a second electrical connector or set of electrical connectors associated with the second support member and means providing electrical connection between said connectors or sets of connectors such as a wiring loom. This will enable wiring from boot lid components to be led to the spring assembly housing and connected to the first connector or set of connectors which are flexibly linked to the opposite connector or set of connectors which can be connected up to the main wiring harness of the vehicle.

It should be appreciated that the cover members 38, 40 in FIG. 1 and 138 in FIG. 3 are not necessary to permit easy installation of the illustrated spring assembly. They do however enhance its appearance, facilitate painting after spring installation and provide extra safety. Similar cover members can be provided in the assembly shown in FIG. 2.

I claim:

1. A spring assembly for attachment to an independently assembled pair of first and second members which are moveable with respect to one another, said spring assembly comprising a coil strip spring member, a first support member having mounted thereon means defining an arcuate path of support for the spring member such that the spring member may be wound against its natural coiling direction by rotation of said means through a part circle and a second support member carrying an abutment member against which said spring member runs so as to force unwinding of said spring coil when said spring member is reverse wound over the arcuate path of support, means interconnecting said first and second support members such as to prevent relative movement thereof which would allow said spring member to coil further, means for attaching said first support member to a said first member, and means for attaching said second support member to a said second member, whereby to provide spring loading for said movement of said first and second members.

2. A spring assembly as claimed in claim 1, wherein the first and second support members each comprise a base plate and said means interconnecting said support members interconnects said base plates.

3. A spring assembly as claimed in claim 2, wherein one of said support member base plates has at least one guidance slot therein and the other of said support member base plates carries a projection running in said guidance slot, said relative movement of the support members to allow further coiling of said spring member about said abutment member being prevented by said projection reaching a limiting position in said guidance slot.

4. A spring assembly as claimed in claim 3, wherein there are at least two said guidance slots each co-operating with a respective said projection.

5. A spring assembly as claimed in claim 2, wherein each said base plate is provided with a respective cover member for defining with the respective base plate a housing for a respective part of said spring member.

6. A spring assembly for attachment to an independently assembled pair of first and second members which are moveable with respect to one another, said spring assembly comprising a coiled strip spring member, means defining an arcuate path of support for said spring member upon which said spring member may be wound against its natural coiling direction by rotation of said path defining means through a part circle, an abutment member radially spaced from said path defining means against which said spring member is supported so as to force unwinding of said spring coil as the spring member is reverse wound onto said path defining means, said spring member, said path defining means and said abutment member being contained within housing means which permits limited planetary motion of said abutment member with respect to said path defining means to tension said spring member by reverse winding said spring member over said path defining means, means for attaching said first support member to a said first member, and means for attaching said second support member to said second member, whereby to provide spring loading for said movement of said first and second members.

7. A spring installation comprising:
first and second sprung members moveable with respect to one another;
a preassembled spring assembly comprising a coiled strip spring member, a first support member having mounted thereon means defining an arcuate path of support for the spring member such that the spring member may be wound against its natural coiling direction by rotation of said means through a part circle and a second support member carrying an abutment member against which said spring member runs so as to force unwinding of said spring coil when said spring member is reverse wound over the arcuate path of support, and means interconnecting said first and second support members such as to prevent relative movement thereof which would allow said spring member to coil further;
means detachably connecting said first support member to said first sprung member; and
means detachably connecting said second support member to said second sprung member;
whereby said movement with respect to one another of said first and second sprung members is resiliently opposed by said spring member.

8. A spring assembly as claimed in claim 7, wherein the first and second support members each comprise a base plate and said means interconnecting said support members interconnects said base plates.

9. A spring assembly as claimed in claim 8, wherein one of said support member base plates has at least one guidance slot therein and the other of said support member base plates carries a projection running in said guidance slot, said relative movement of the support members to allow further coiling of said spring member about said abutment member being prevented by said projection reaching a limiting position in said guidance slot.

10. A spring assembly as claimed in claim 9, wherein there are at least two said guidance slots each co-operating with a respective said projection.

11. A spring assembly as claimed in claim 10, wherein each said base plate is provided with a respective cover member for defining with the respective base plate a housing for a respective part of said spring member.

12. A spring installation comprising:
first and second sprung members moveable with respect to one another;
a preassembled spring assembly comprising a coiled strip spring member, means defining an arcuate path of support for said spring member upon which said spring member may be wound against its natural coiling direction by rotation of said path defining means through a part circle, an abutment member radially spaced from said path defining means against which said spring member is supported so as to force unwinding of said spring coil as the spring member is reverse wound onto said path defining means, said spring member, said path defining means and said abutment member being contained within housing means which permits limited planetary motion of said abutment member with respect to said path defining means to tension said spring member by reverse winding said spring member over said path defining means;
means detachably connecting said first support member to said first sprung member; and
means detachably connecting said second support member to said second sprung member;
whereby said movement with respect to one another of said first and second sprung members is resiliently opposed by said spring member.

* * * * *